United States Patent [19]

Minami

[11] Patent Number: 5,038,290

[45] Date of Patent: Aug. 6, 1991

[54] MANAGING METHOD OF A RUN OF MOVING OBJECTS

[75] Inventor: Hideaki Minami, Osaka, Japan

[73] Assignee: Tsubakimoto Chain Co., Osaka, Japan

[21] Appl. No.: 401,023

[22] Filed: Aug. 31, 1989

[30] Foreign Application Priority Data

Sep. 13, 1988 [JP] Japan .................. 63-229449

[51] Int. Cl.$^5$ .................. G06F 15/48; G06F 15/50
[52] U.S. Cl. .................. 364/436; 364/424.02; 364/461
[58] Field of Search .................. 364/424.01, 424.02, 364/424.03, 424.04, 436, 437, 439, 441, 461, 578

[56] References Cited

U.S. PATENT DOCUMENTS

| | | | |
|---|---|---|---|
| 4,122,523 | 10/1978 | Morse et al. | 364/436 |
| 4,630,216 | 12/1986 | Tyler et al. | 364/478 |
| 4,764,873 | 8/1988 | Libby | 364/461 |
| 4,827,418 | 5/1989 | Gerstenfeld | 364/439 |
| 4,862,373 | 8/1989 | Meng | 364/444 |

*Primary Examiner*—Thomas G. Black
*Assistant Examiner*—Thomas S. Auchterlonie
*Attorney, Agent, or Firm*—Darby & Darby

[57] ABSTRACT

A managing method of a run of a moving object of the present invention commonly utilizes a first scheduling using a simulation for finding a shortest time for selecting the moving object and running route corresponding to the moving demand, and a second scheduling in which a deadlock attributable to a predetermined moving sequence is not generated, performing the first scheduling using the simulation first and when it is not fulfilling a predetermined condition, performing the second scheduling.

7 Claims, 10 Drawing Sheets

MANAGING METHOD OF A RUN OF MOVING OBJECTS

BACKGROUND OF THE INVENTION

1. Field of the Invention

The present invention relates to a managing method of a run of movable objects such as a non-attendant transporting vehicle and the like, more specifically, it relates to a managing method of a run of movable objects in which the simulation result and a predetermined moving sequence are used together to select the movable objects and running routes in response thereto.

2. Description of Related Art

Recently, thanks to development of the so-called factory automation (FA), a non-attendant transporting vehicle which is a moving object running automatically without attendant is used for transporting material parts or half-finished parts in the factory, or further for storing and shipping materials and products in and out from the warehouse.

However, when managing a run of the non-attendant transporting vehicle as described above, a deadlock or standstill situation may arise between successive vehicles which disable the control and so creates a problem. In order to avoid this problem, restrictions are made to the layout and running of a wagon, or methods and programs are prepared for every individual case. For instance, it has been devised to restrict the running direction on the route to one way, or to restrict the routes between stations to one, and locally controlling at branches and junctions by a sensor such as an ultrasonic sensor, a photoelectric switch etc., or to leave sufficient space on the route so as not to influence the branches and junctions even when a succeeding vehicle is stopped due to operations of a preceding vehicle.

In a managing method of a run employing such restrictions, however, since two-way running on a single route is not possible, such problems as follows are encountered; the transportation efficiency deteriorate and space utilization efficiency, cost increases due to installation of sensors for local branch-junction control and the flexibility of layout decreases. It is also disadvantageous with respect to reliability, maintainability and cost since the programs cannot be standardized.

There is a method using an internal simulation as one of the methods for selecting and deciding a transporting vehicle and for flexibility running the route to standardize the programs, without restricting as much as possible the layout such as a single route running one-way. That is, a method for selecting the transporting vehicle and deciding the running route under a constant reference, by performing the internal simulation for every transporting vehicle including the running vehicle and every route, when the moving demand is generated.

According to the internal simulation, the moving demand may be realized within the shortest possible time. However, combinations are always a problem, the number of which becomes huge when all transporting vehicles and routes have to be simulated.

When a specific vehicle is directed to a specific station on a specific running route, and when the other vehicle is stopped on the running route or at station, the shunting is generated. When the shunting is generated, the simulation must be performed including movement for shunting of the impeding vehicle, which, in turn, may cause shunting of the other vehicle and so on in a chain reaction. If all combinations are simulated, it takes a lot of time to get an answer for one moving demand, which is impractical.

When managing a run by the simulation, the aforesaid deadlock disabling the simulation may occur.

As a managing method of a run without using the simulation, moving sequences including the operations of loading and unloading may be prepared in advance for every condition. For every demand for moving each of the vehicles including the running vehicle the managing method includes calling the one corresponding to the condition, and selecting the vehicle and deciding the running route including the movement of the other vehicle. According to this method, since the deadlock can be checked in advance, there is no possibility of the deadlock. However, the more in advance that the optimum vehicle and running route are to be decided, the more the condition must be classified precisely to circumstances, resulting in a large number of moving sequences as well as utilization of a greater capacity of memory. Further, it takes longer to set data for preparing the moving sequences, which is not practical.

SUMMARY OF THE INVENTION

The present invention has been devised in view of such circumstances. Therefore, it is an object of the present invention to provide a managing method of a run of movable objects. Although the running of a non-attendant vehicle is usually managed by simulation under a predetermined restriction to decide the optimum running conditions. When the time and number required for deciding the running conditions by the simulation have exceeded a predetermined condition, the managing method of the invention calls for selecting the optimum condition from a predetermined moving sequence so that a single two-way running route is made possible and the processing time is shortened. Thereby, the moving object can be selected with a small capacity of memory and the moving route capable of avoiding a deadlock or standstill can be decided.

The above and further objects and features of the invention will more fully be apparent from the following detailed description with accompanying drawings.

DESCRIPTION OF THE PREFERRED EMBODIMENTS

Figure 1:
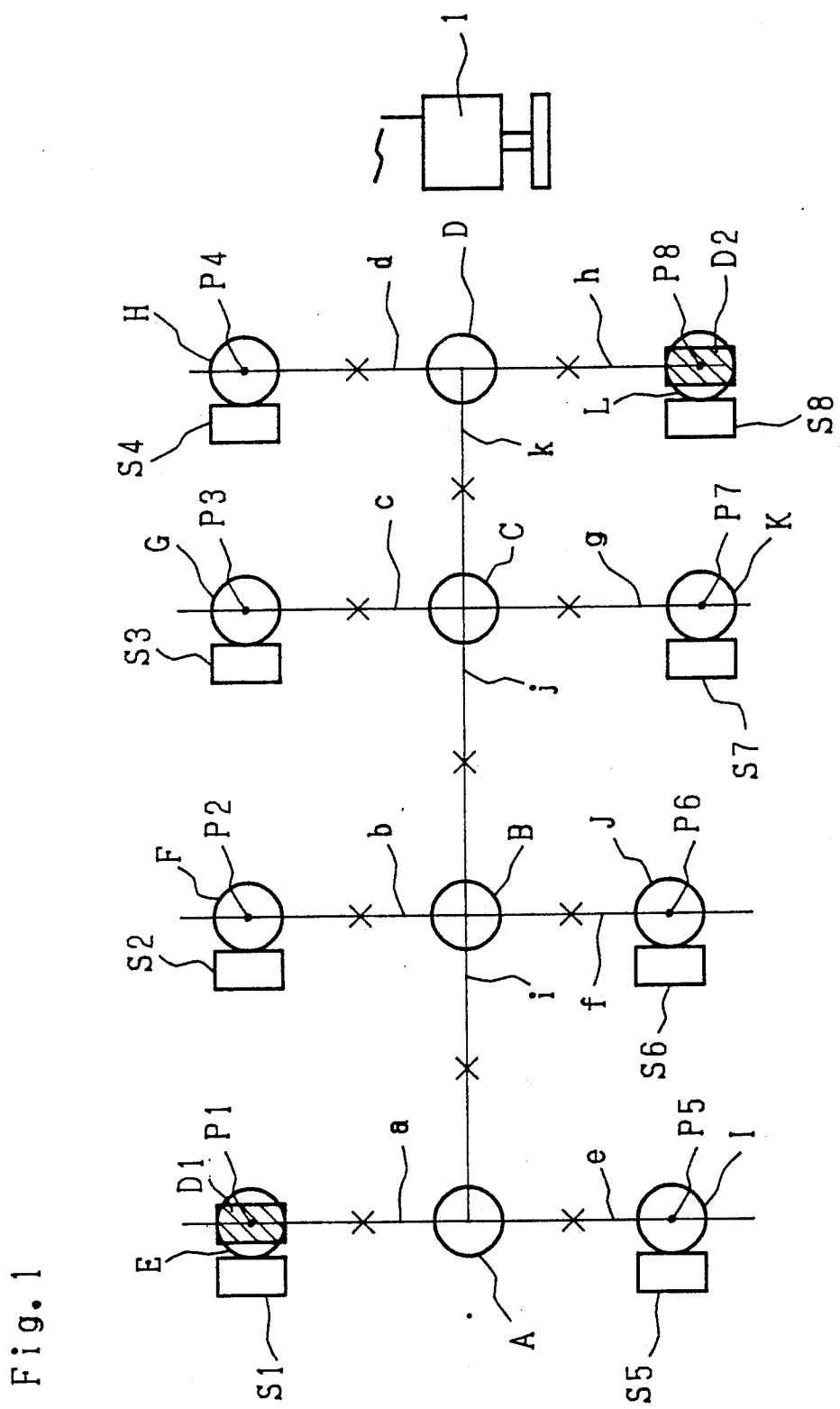
FIG. 1 is a schematic plan view showing an example of running routes of a wagon as a non-attendant vehicle together with two wagons, in which a managing method of a run of a moving object according to the present invention is applied.

In the following, the present invention will be described referring to the drawings showing the embodiments.

As shown in FIG. 1, running routes, as a whole, comprise a main route consisting of pathes i, j and k connected in series in this order, four sub-routes consisting paths a, e and paths d, h intersecting the main route in T-shape respectively at opposite ends thereof and four sub-routes respectively crossing the main route at the junctions between the paths i and j and the paths j and k. At the intersections between the main route and the sub-routes, namely, at one end of the path i away from the path j is designated a branch-junction area (hereinafter referred to as area) A, at the junction between the paths i and j is designated an area B, at the junction between the paths j and k is designated an area C, and at other the end of the path k is designated an area D.

From each of the areas A, B, C and D, in both directions intersecting the main route, the paths a and e, b and f, c and g, and d and h respectively forming the sub-routes are extended respectively. At positions facing extended side ends of respective paths a, b, c, d, e, f, g and h, stations S1~S8 for transferring the goods to and from wagons D1 and D2 are provided, and stations points P1~P8 are set on each of the paths a~k for stopping the wagons D1 and D2 after positioning of the wagons at each of stations S1~S8, on which areas E~L are also provided.

The wagons D1 and D2 may run two-ways (bi-directionally) on all the paths a~k. At stations S1~S8, since there is not enough space, only one of the wagons D1, D2 is allowed to stop.

The wagons D1, D2 are run by driving wheels on the both sides which are driven by a motor powered by a battery installed thereon. The wagons D1, D2 are constructed such that, by changing the speed of revolutions of the two driving wheels, directions can be changed in both directions. Further, their running distance is detected by calculating the revolutions of the driving wheels so as to recognize present position of the wagons, or the position on any of the paths a~k and in any of the areas A~L shown in FIG. 1. The wagons are provided with a radio transmitter to transmit their present position to a central control unit 1 to be described later.

The running control of the wagons D1, D2 with respect to the intersection, entry etc. in each of the areas is effected in accordance with instruction data transmitted from the central control unit 1 as to be described later.

The central control unit 1 executes by simulations, on the basis of the present positions of each of the wagons D1, D2 transmitted therefrom by the radio communication, a first scheduling of the running management such as selecting the wagons D1, D2 and deciding the running routes thereof (sequence of areas and paths to be passed from the present position to the final destination) to fulfill the moving demands of the wagons inputted from outside. When the first scheduling by the simulation does not satisfy the conditions specified by a predetermined number, a second scheduling is executed. The second scheduling is designed to select the moving sequence corresponding to the moving demand among the predetermined moving sequences on the basis of arrangements of respective wagons D1, D2, for scheduling thereby.

The central control unit 1 utilizes a microcomputer system, in a memory of which, for example, the following data are stored for the running paths shown in FIG. 1. That is, the transit time (seconds) of the wagon through the respective areas A~L shown in Table 1, the transit time (seconds) of the wagon through the respective paths a~k shown in Table 2, a definition of running routes shown in Table 3, the transferring time (seconds) through respective stations S1~S8 shown in Table 4 and moving sequences shown in Table 5. Moving demands from outside and the following data necessary to realize them are added, modified or generated as required. That is, the moving demand of the wagon shown in Table 6, running schedules of the wagons D1, D2 shown in Table 7, conditions of respective stations shown in Table 8, conditions of respective wagons D1, D2 shown in Table 9, area waiting conditions shown in Table 10, course setting for scheduling shown in Table 11, course setting of the wagon generated for sequential numbering shown in Table 12, area waiting conditions for scheduling shown in Table 13 and running schedules for scheduling shown in Table 14.

The method of scheduling will be more specifically described.

Here, an example is shown in which the wagons D1, D2 are at standstill or deadlock at stations S1, S8 and two moving demands, stations 2→1 and stations 1→8 are made. In this case, the moving demand of the wagon is as shown in Table 6. The scheduling for the moving demand of station 2→1 of the sequential numbering $D_N = 1$ among the moving demands shown in Table 6 is executed first.

Figure 2:
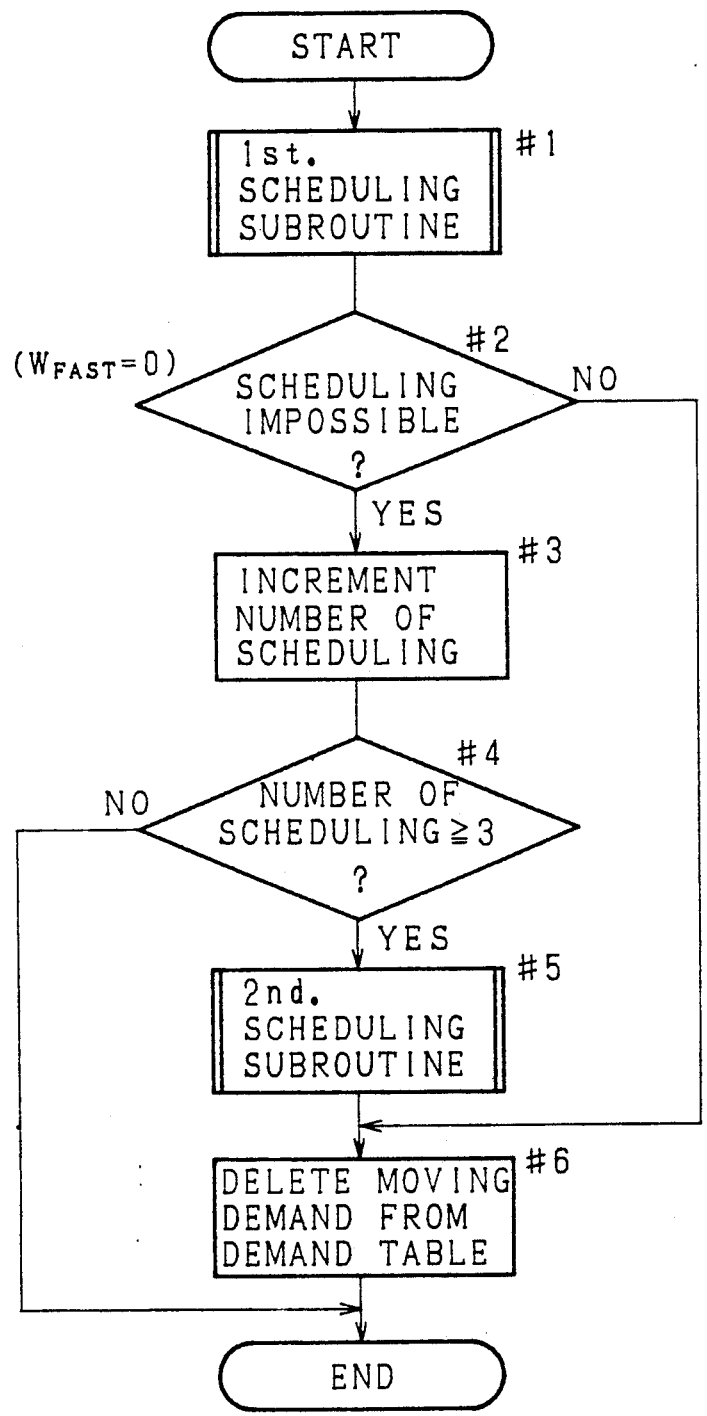
FIG. 2 is a flow chart of a main routine of the present invention.

FIG. 2 is a flow chart showing a main routine of the scheduling. First, in Step #1, the procedure is moved to a subroutine of a first scheduling by the simulation and the first scheduling is executed. In the first scheduling, on the basis of the wagon running schedule shown in Table 7 and the area waiting condition shown in Table 10, using the area and path transit time shown in Tables 1 and 2 and the station transferring time shown in Table 4, the wagon and its running routes for realizing the demand in a shortest time are selected for all wagons. Next, in Step #2, it is determined whether or not the first scheduling by the simulation was possible. As a reference of the embodiment, when shunting by moving the wagon has occurred even once during the simulation, the first scheduling is determined as disapproved at that point, since it takes time for processing thereof. If disapproved, in Step #3, the number of schedulings is incremented by 1, and if approved, the procedure is skipped to Step #6. When the number of schedulings is incremented by 1, it is temporarily reserved till the next scheduling. Though scheduling for the other moving demand is then performed, when the wagon necessary for shunting as the result thereof is moved, the shunting may not occur when rescheduled for the previous moving demand and the first scheduling may be possible. When, however, only one moving demand is made, whenever the first scheduling is performed, the result is scheduling disapproved and the number of schedulings is continuously incremented by 1. Then, in Step #4, it is determined whether the number of scheduling is three times or more, if so, it is determined that the wagon and its running routes cannot be selected and decided only by the first scheduling, thus a second scheduling is executed in Step #5. If it is less than three times, processing is completed. The second scheduling is performed on the basis of the moving sequence shown in Table 5 and the conditions of respective stations shown in Table 8, and though the moving demand cannot be expected to be realized in a shortest time, since it is performed in response to the moving sequences set such that the wagons D1, D2 are movable under any conditions, the moving demand is always realized without a deadlock. When the second scheduling is completed, in Step #6, the moving demand whose scheduling is completed is deleted from Table 6 and the processing is completed.

Figure 3:
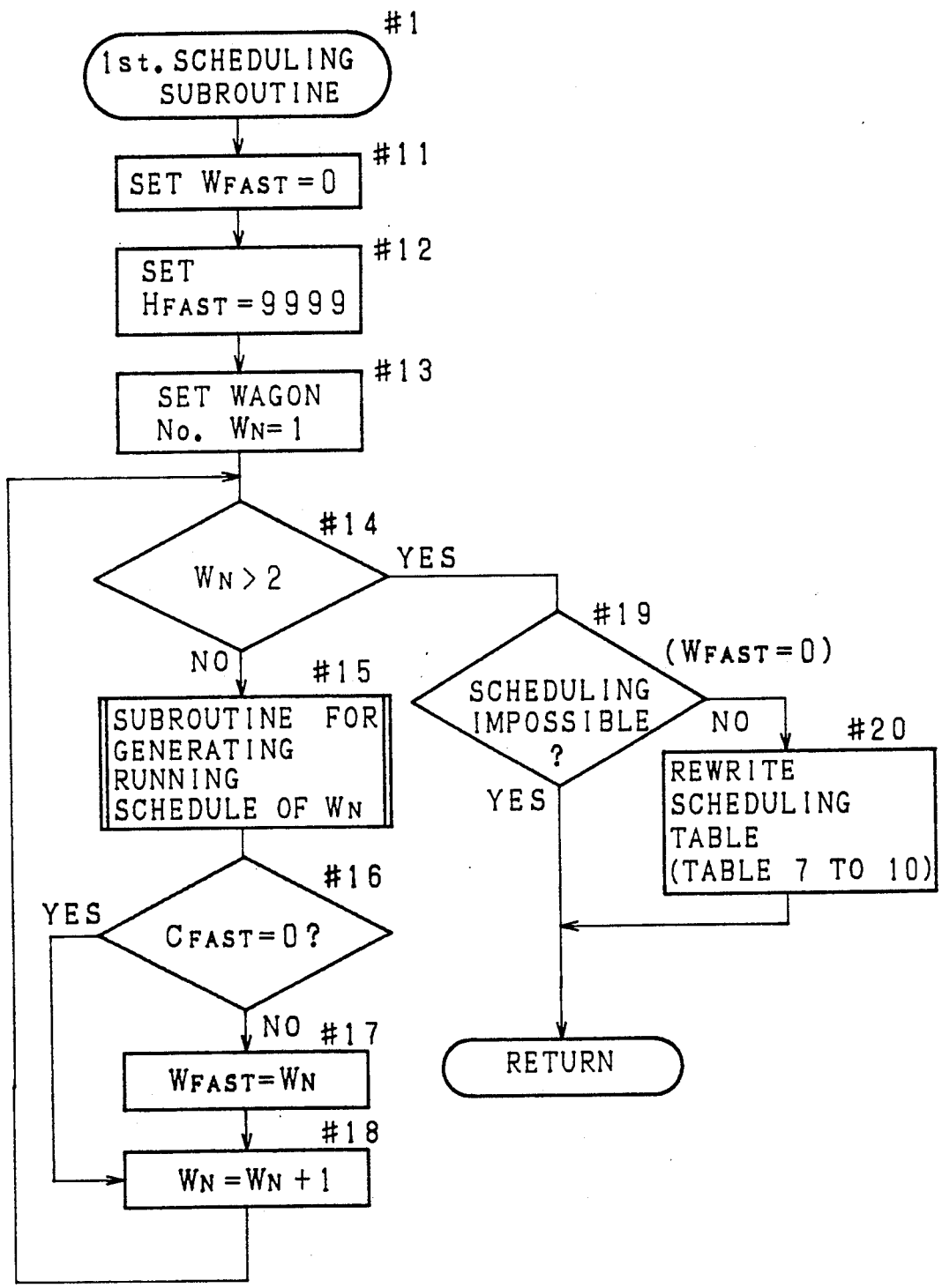
FIG. 3 is a flow chart of a first scheduling subroutine.

Now the first scheduling will be described. FIG. 3 is a flow chart of a subroutine of the first scheduling.

Data shown in Tables 7~10 are those before the first scheduling. In Table 7, at ($RN_{AT}$) indicates the arrival time of the wagon at the location ($RN_p$), in ($RN_{IN}$) indicates the starting time to enter the location, out ($RN_{OUT}$) indicates the arrival time at the end of the location, and gone ($RN_{GONE}$) indicates the time whereat the wagon gets out completely from the location. Though the time represents the time of a second timer, since all wagons D1, D2 are already in the areas A~L and standing still in the initial condition, at, in, out are all 0 and gone indicates a maximum value 9999.

In Table 10, as to a priority flag $Q_{PRI}$, $Q_{PRI}=1$ represents that entrance to the location is already approved for the wagons D1, D2 and the entering priority is decided. Thus, the wagon is prohibited from entering the location prior to its order of priority during the scheduling processing.

In FIG. 3, first in Step #11, a fastest wagon $W_{FAST}=0$, that is, which runs on the shortest routes is set to show there is no fastest wagon $W_{FAST}$ at this point of time. Next, in Step #12, the shortest arrival time $H_{FAST}$ is set to the longest time 9999. Then, in Step #13, the wagon No. $W_N$ is set to 1. In Step #14, it is determined whether running schedules are generated for all wagons, or the wagon No. $W_N > 2$ in this case, if so or the running schedules are generated, it is determined in Step #19 whether the scheduling is unsuccessful or not, if not or it is successful, contents of Tables 7~10 are rewritten in Step #20 on the basis of contents of Tables 11~14 and the procedure is returned, if unsuccessful, the procedure is returned intact. When rewriting Table 10, $Q_{GONE}(N)$ is set as $SR_{IN}(N+1) + T_{PASS}$, where $T_{PASS}$ is the time for the wagon to pass through one point. If $W_N \leq 2$ in Step #14, the running schedule of the wagon No. $W_N$ is generated in Step #15. Next, in Step #16, it is determined whether the shortest course $C_{FAST}$ is present, or the shortest course $C_{FAST}=0$, if the shortest course $C_{FAST}=0$ or the shortest course $C_{FAST}$ is present, the fastest wagon No. $W_{FAST}$ is rewritten to the wagon No. $W_N$ in Step #17. If the shortest course $C_{FAST}=0$ or the shortest course $C_{FAST}$ is absent, Step #17 is skipped and the procedure is advanced to Step #18 without rewriting the fastest wagon $W_{FAST}$. In Step #18, the wagon No. $W_N$ is incremented by 1, generating the running schedule of the following wagon and the internal simulation is performed. After generating the running schedule and completing the internal simulation for all wagons, the procedure is advanced to Step #19 previously described.

Figure 4:
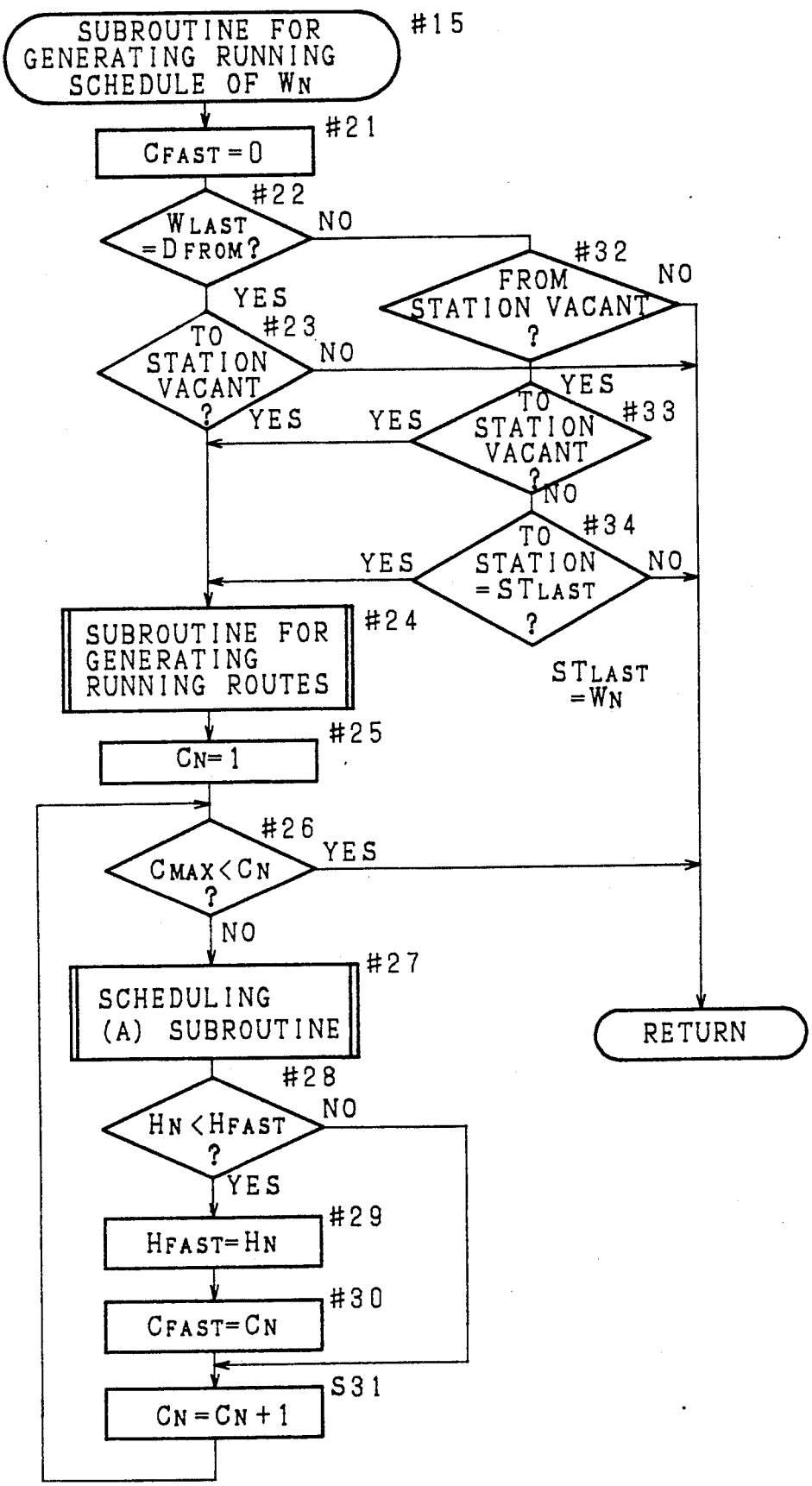
FIG. 4 is a flow chart of a running schedule generating subroutine.

FIG. 4 is a flow chart showing a subroutine for generating running schedules. In Step #21, the shortest course $C_{FAST}$ is set to 0, and it is determined in Steps #22, #23 and #32~#34 whether the FROM station $D_{FROM}$ of the moving demand or the starting point and TO station $D_{TO}$, or the end point are all vacant and accessible. Vacancy is checked on the basis of the station condition shown in Table 8, and stations S1~S8 are vacant when the last stopping wagon $ST_{LAST}=0$. In this embodiment, since the FROM station $D_{FROM}=2$ is vacant, TO station $D_{TO}=1$ is the last stopping wagon $ST_{LAST}=1$ and the wagon No. $W_N=1$ is the last station $W_{LAST}=1$, Step #22=NO, Step #32=YES, Step #33=NO and Step #34=YES, and the running routes are generated in Step #24. Here, the course table for scheduling shown in Table 11 is generated, the route No. $C_N=1$ is set in Step #25, and in Step #26, it is determined whether the route No. $C_N=1$ is larger than the number of routes $C_{MAX}$, and if so, the procedure is returned, and if not, scheduling (A) is executed in Step #27 and the arrival time $H_N$ at the end point $D_{TO}$ is obtained, and it is determined in Step #28 whether this is smaller than the preceding shortest time $H_{FAST}$, and if so the shortest time $H_{FAST}$ is rewritten into this arrival time $H_N$ in Step #29, and the shortest course $C_{FAST}$ is also rewritten into the route No. $C_N$ in Step #30, the route No. $C_N$ is incremented by 1 in Step #31, and the procedure is returned to Step #26. When it is not smaller in Step #28, Steps #29 and #30 are skipped and advanced to Step #31 to perform schedulings for all routes.

Figure 5:
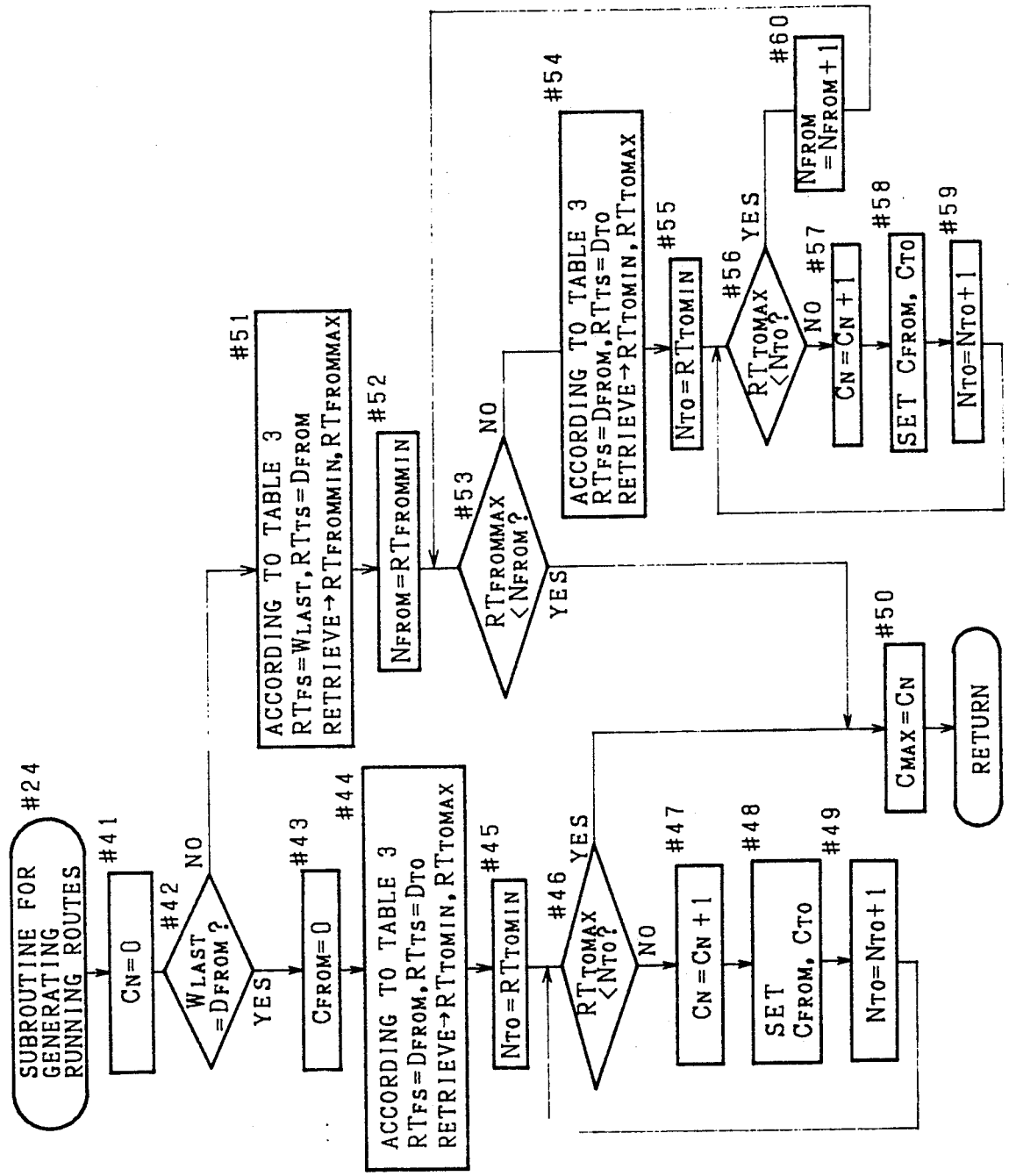
FIG. 5 is a flow chart of a running route generating subroutine.

FIG. 5 is a flow chart of a running route generating subroutine. In Step #41, the route No. $C_N$ is set to 0 and it is determined in Step #42, whether the wagon last station $W_{LAST}$ and starting point $D_{FROM}$ are coincided, and if not the procedure is advanced to Step #51. In the embodiment, since the wagon last station $W_{LAST}=1$ and the starting point $D_{FROM}=2$ for the wagon NO. $W_N=1$ from Table 9, it is not coincided, thus the procedure advances to this Step #51. In Step #51, for deciding the route $C_{FROM}$ from the wagon last station $W_{LAST}$ to the starting point, the route $R_{NM}$ of FROM station $RT_{FS}=$wagon last station $W_{LAST}$ and TO station $RT_{ts}=$starting point $D_{FROM}$ is retrieved to decide the minimum route $RT_{FROMMIN}$ and the maximum route $RT_{FROMMAX}$.

In this embodiment, since there is only one route between respective stations, $RT_{FROMMIN} = RT_{FROMMAX} = 1$ ($R_{NM}$), but, in general, routes are in plural, so that in Step #52, counter $N_{FROM} = RT_{FROMMIN}$ is set and in Step #53, Steps #54~#60 are repeated until the counter $N_{FROM}$ becomes larger than $RT_{FROMMAX}$ in Step #53. In Step #54, in order to decide the route $C_{TO}$ from the starting point $D_{FROM}$ to end point $D_{TO}$, the route $R_{NM}$ of FROM station $RT_{FS}=D_{FROM}$ and TO station $RT_{TS}=D_{TO}$ of Table 3 is retrieved to decide the minimum route $RT_{TOMIN}$ and the maximum route $RT_{TOMAX}$. As described above, in the embodiment, $RT_{TOMIN} = RT_{TOMAX} = 8(R_{NM})$. Next, in Step #55, counter $N_{TO} = RT_{TOMIN}$ is set and Steps #56~#59 are repeated until the counter $N_{TO}$ becomes larger than $RT_{TOMAX}$ in Step #56. In Step #57, the route No. $C_N$ is incremented by 1 and in Step #58, the route $C_{FROM}$ to the starting point and the route $C_{TO}$ from the starting point to end point are set in the $C_N$th route No. of Table 12. In the case of this embodiment, in the route No. $C_1$, the route $R_{NM}=1$ and the route $R_{NM}=8$ of Table 3 are set respectively as $C_{FROM}$ and $C_{TO}$. Then the procedure is returned to Step #56, wherein if the counter $N_{TO}$ becomes larger than $RT_{TOMAX}$, the counter $N_{FROM}$ is incremented by 1 in Step #60 and returned to Step #53, wherein if the counter $N_{FROM}$ becomes larger than $RT_{FROMMAX}$, the number of routes $C_{MAX}$ is rewritten into the route No. $C_N$ in Step #50.

While, when the wagon last station $W_{LAST}$ and the starting point $D_{FROM}$ are coincided in Step #42, since the route $C_{FROM}$ to the starting point $D_{FROM}$ is not necessary, Steps #45~#49 corresponding to Steps #55~#59 of the route $C_{TO}$ from the starting point $D_{FROM}$ to the end point $D_{TO}$ are executed, and if the counter $N_{TO}$ is larger than $RT_{tomax}$ in Step #46, the procedure is advanced to Step #50 aforementioned and then returned. In such a manner, the course shown in Table 11 is set whenever the moving demand is made. The course table of the embodiment shows the course table shown in Table 12 with respect to the moving demand 1.

Figure 6A:
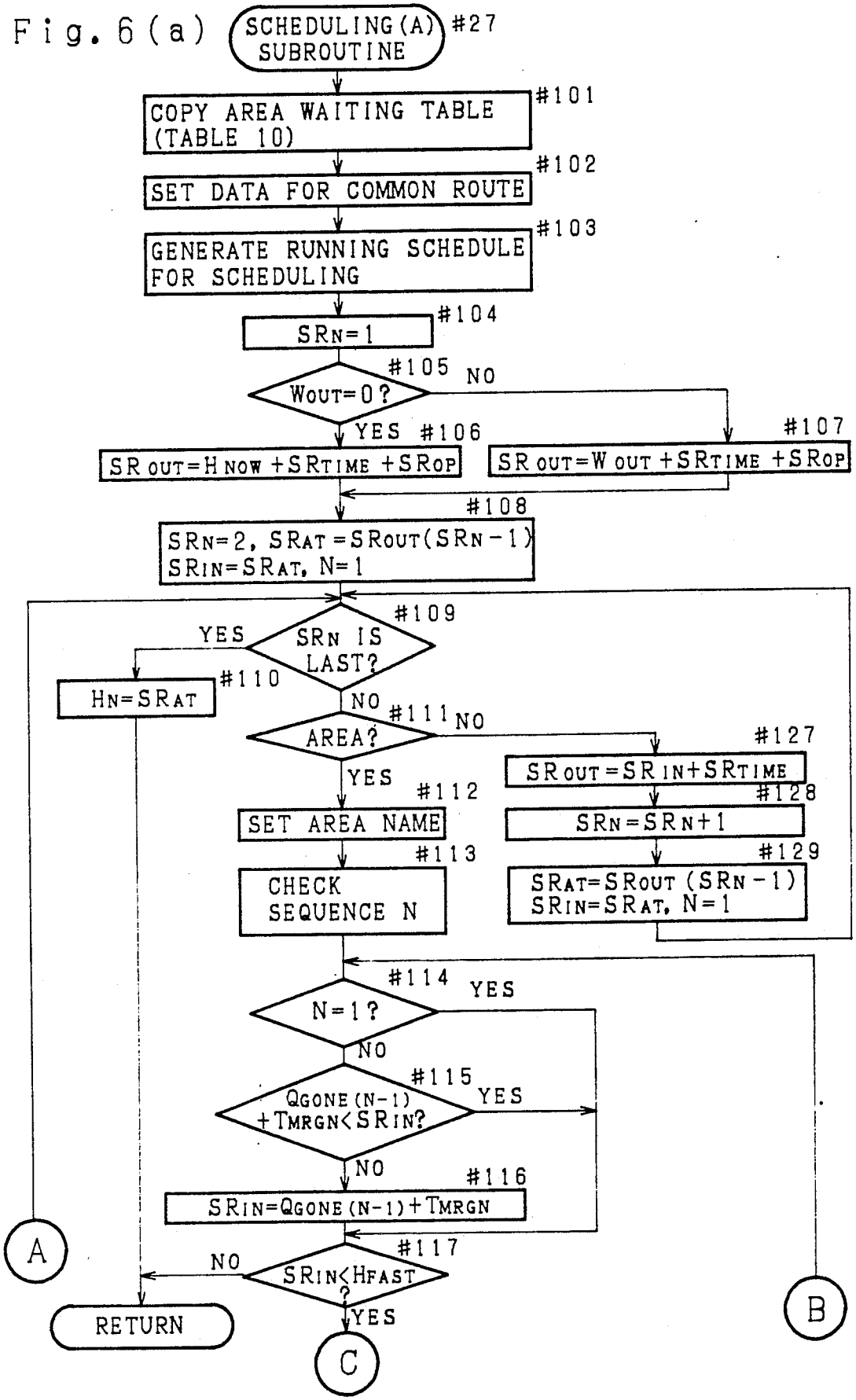
FIGS. 6(a), 6(b) are a flow chart of a scheduling (A) subroutine.
Figure 6B:
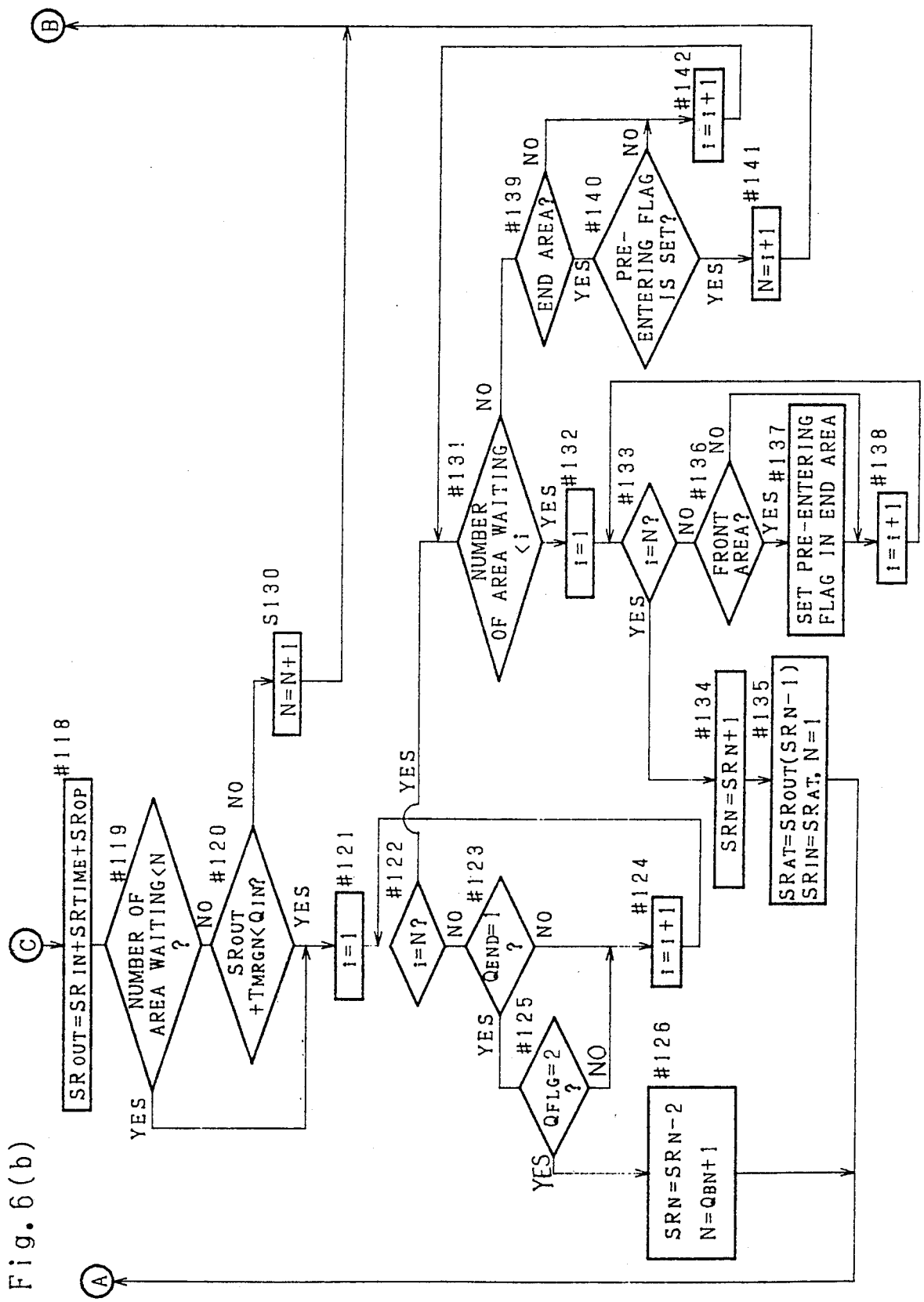

FIGS. 6(a), 6(b) are a flow chart showing a scheduling (A) subroutine. In the scheduling (A), first in Step #101, the area waiting table of Table 10 is copied to prepare the scheduling area waiting table shown in Table 13. Then in Step #102, items of front $Q_{BGN}$, end area $Q_{EAR}$, end sequence $Q_{EN}$, end $Q_{END}$, front area $Q_{BAR}$, front sequence $Q_{BN}$, and preceding/succeeding identification flag $Q_{FLG}$ are added. These are data used for adjusting queuing when a common route is generated between the wagons.

Figure 7:
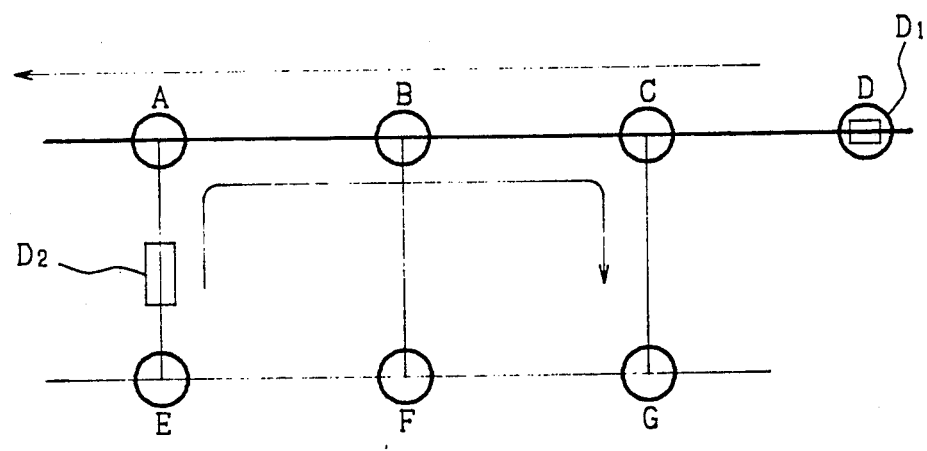
FIG. 7 is a schematic view explaining a common route.

FIG. 7 is an explanatory view of a common route, in which when a wagon is scheduled, if there is a common route between the other wagon running at present, an area which is owned jointly first viewing from the wagon to be scheduled is made the front and an area owned commonly later is made the end, if front, $Q_{BGN}=1$ and its end area $Q_{EAR}$ and its sequence are set, if end, $Q_{END}=1$ and its front area $Q_{BAR}$ and its sequence are set. In the case of FIG. 7, in corresponding locations in the area C of the other running wagon in the scheduling area waiting table shown in Table 13, front $Q_{BGN}=1$, end area $Q_{EAR}=B$, the sequence of the other wagon in the area B in the area waiting table, end $Q_{END}=0$, front area $Q_{BAR}=0$ and front sequence $Q_{BN}=0$ are set respectively, as shown in Table 15. As for the areas B and A, those are set similarly.

In the preceding/succeeding indentification flag $Q_{FLG}$, though 1 (preceding) or 2 (succeeding) is set according to the scheduling, an initial value at the end is 2 (succeeding). In the embodiment, since there is no other running wagon, these are not set.

Next, in Step #103, running schedules for scheduling shown in Table 14 are generated. At this time, Tables 1~4 are used and the location $SR_p$, operation time $SR_{OP}$ and transit time $SR_{TIME}$ are set. The transit time in the area E at sequential numbering $SR_N=1$, 13 is respectively the accelerating time from standstill and the deceleration time from the running condition to standstill and is set to two seconds. The arrival time $SR_{AT}$, start entering time $SR_{IN}$ and escape time $SR_{OUT}$ of Table 14 are set in the following steps.

First the escape time $SR_{OUT}$ from the wagon last station $W_{LAST}$ is calculated. That is, in Step #104, the sequential numbering $SR_N=1$ is set and in Step #105, it is determined whether the arrival schedule time $W_{OUT}$ is 0. Since the arrival rival schedule time $W_{OUT}$ is 0 when the wagons D1, D2 arrive at the location, running is possible from the present time $H_{NOW}$ so that the escape time $SR_{OUT}$ becomes present time $H_{NOW}$ so that the escape time $SR_{OUT}$ becomes present time $H_{NOW}+$ transit time $SR_{TIME}+$ operation time $SR_{OP}$ in Step #106. When $W_{OUT} \neq 0$, the escape time $SR_{OUT}$ becomes $W_{OUT}+SR_{TIME}+SR_{OP}$ in Step #107. Then, in Step #108, sequential numbering $SR_N=2$ is set and the arrival time $SR_{AT}$ and start entering time $SR_{IN}$ at sequential numbering $SR_N=2$ are decided. That is, the escape time $SR_{OUT}(SR_N-1)$ of the preceding transit location becomes $SR_{AT}$ and $SR_{IN}$. Next, in Step #109, it is determined whether the sequential numbering $SR_N$ is the last, and if so, in Step #110, the arrival time $SR_{AT}$ at the last location is made the scheduling arrival time $H_N$ and the procedure is returned. If not, in Step #111, it is determined whether it is the area by whether or not the sequential numbering $SR_N$ is an odd number, and if it is the odd number, since it is the area, the area name is set in Step #112 and in Step #113, the sequence N in Table 3 into which the wagon can be inserted is checked to decide the sequence N taking into account of the priority flag $Q_{PRI}$. Then, in Step #114, it is determined whether the sequence N is 1, and if so, since it is the first wagon, the start entering time is not needed to be checked so that the procedure is skipped to Step #117, and if sequence $N \neq 1$, in Step #115, it is determined whether the sum of the time $Q_{GONE}(N-1)$ for the preceding pre-entering wagon (sequence (N-1) in Table 13) to escape completely from the area, and the time margin $T_{MRGN}$ till the following wagon is allowed to enter the area after the pre-entering wagon has escaped the area, is smaller than the area entering time $SR_{IN}$ of the wagon to be scheduled, and if so, since there is an enough entering time, the procedure is skipped to Step #117, and if not, in Step #116, the area entering time $SR_{IN}$ is set to $Q_{GONE}(N-1)+T_{MRGN}$. That is, the wagon has to wait. Next, in Step #117, it is determined whether the entering time $SR_{IN}$ is smaller than the shortest time $H_{FAST}$, and if not, the scheduling is stopped at this point and the procedure is returned assuming that it takes longer time than the other case being scheduled already. If smaller, the scheduling is continued and in Step #118, escape time $SR_{OUT}=SR_{IN}+SR_{TIME}+SR_{OP}$ is set and in Step #119, whether the number of area waiting is smaller than the sequence N. If so, since the scheduling wagon is the last entering wagon to that area, there is no succeeding wagon and the escape time $SR_{OUT}$ is not necessary to be checked, so that the procedure is skipped to Step #121, and if not, in Step #120, whether escape time $SR_{OUT}+$ margin time $T_{MRGN}$ of the scheduling wagon is smaller than the start entering time $Q_{IN}$ of the wagon succeeding immediately after (sequence N in Table 3) into the area is determined, and if so, since the succeeding wagon is not interfered, entering into the area at the sequence Nth is approved tentatively. However, if the area is at the end of the common route, there is a possibility that the wagon which has passed as the scheduling and succeeding in the area enters the area first to make running impossible, so that in Step #121, a sequence counter is set to 1 to check the pre-entering wagon. If not, the occupying time of the area is overlapped to interfere the succeeding wagon, so that the sequence N of the scheduling wagon is incremented by 1 so that the scheduling wagon enters the area after the succeeding wagon, and Step #114 onward are repeated. In Step #122 wherein the pre-entering wagon is checked, it is determined whether the sequence counter i and the sequence N are same, and if not, since the pre-entering wagon is not checked yet, in Step #123, whether the area is the end of the common route is determined. If not ($Q_{END}=0$), the sequence counter i is incremented by 1 in Step #124 and the procedure is returned to Step #122. If so ($Q_{END}=1$), in Step #125, whether succession or not is determined by the value of $Q_{FLG}$. If so ($Q_{FLG}=2$), it means that the pre-entering wagon is succeeding to the front area and running is interfered, so that the variable number $SR_N$ is returned to the front area in Step #126 to avoid it ($SR_N=SR_N-2$), and the sequence N is changed (N=head sequence $Q_{BN}+1$) to bring the other wagon having a problem as the pre-entering wagon. The procedure is then returned to Step #109. If not ($Q_{FLG}\neq 2$) is Step #125, since it is the pre-entering wagon in the front area and is consistent, the procedure is advanced to Step #124.

While, if it is same in Step #122, it means that the pre-entering wagon has been completely checked, so the succeeding wagon is checked next. First, in Step #131, it is determined whether the number of area waiting is smaller than the sequence counter i, and if so, it means that the succeeding wagon has been completely checked, so subsequently the pre-entering flag is set. That is, if the area is the front of the common route for the pre-entering wagon, the pre-entering flag is set ($Q_{FLG}=1$) in the end area for checking the succeeding wagon at the end. In Step #132, first the sequence counter i is set to 1, and in Step #133, it is determined whether the sequence counter i and the sequence N are same. If so, since the pre-entering flag has been set, the procedure is advanced to Step #134 to increment the sequential numbering $SR_N$ by 1, and in Step #135, the arrival time $SR_{AT}$ of the sequential numbering $SR_N+1$ is set to the escape time $SR_{OUT}$ of the previous sequential numbering $SR_N$, ($SR_N-1$), and also to $SR_{IN}=SR_{AT}$, N=1, then the procedure is returned to Step #109 to process the next sequential numbering $SR_N+1$.

If not in Step #133, whether it is the front area or not is determined in Step #136, and if so, the pre-entering flag is set in the end area in Step #137 ($Q_{FLG}=1$) and sequence counter i is incremented by 1 before the procedure returns to Step #133.

If the number of area waiting is not smaller than the sequence counter i in Step #131, whether the end area or not is determined in Step #139. If so ($Q_{END}=1$), whether the pre-entering flag is set to pre-entering is determined in Step #140. If so ($Q_{FLG}=1$), since the wagon pre-entering the areas already past becomes the succeeding wagon in this area and its running is interfered, the sequence N is set to counter i+1 in Step #141 to let the wagon pre-enter the area, then the procedure is returned to Step #114. If not ($Q_{END}=0$) in Step #142, or if pre-entering is not set in Step #140 ($Q_{FLG}\neq 0$), the sequence counter i is incremented by 1 to continue checking of the succeeding wagon, and the procedure is returned to Step #131.

While, if it is not the area in Step #111 ($SR_N$ is even number) or it is the path, the escape time $SR_{OUT}$ is set to $SR_{IN}+SR_{TIME}$ in Step #127 and the sequential numbering $SR_N$ is incremented by 1 in Step #128. The arrival time $SR_{AT}$ of the following sequential numbering $SR_N+1$ is set to the escape time $SR_{OUT}$ of the previous sequential numbering $SR_N$ in Step #129, and the entering time $SR_{IN}=SR_{AT}$, N=1 are set and the procedure is returned to Step #109.

Figure 8:
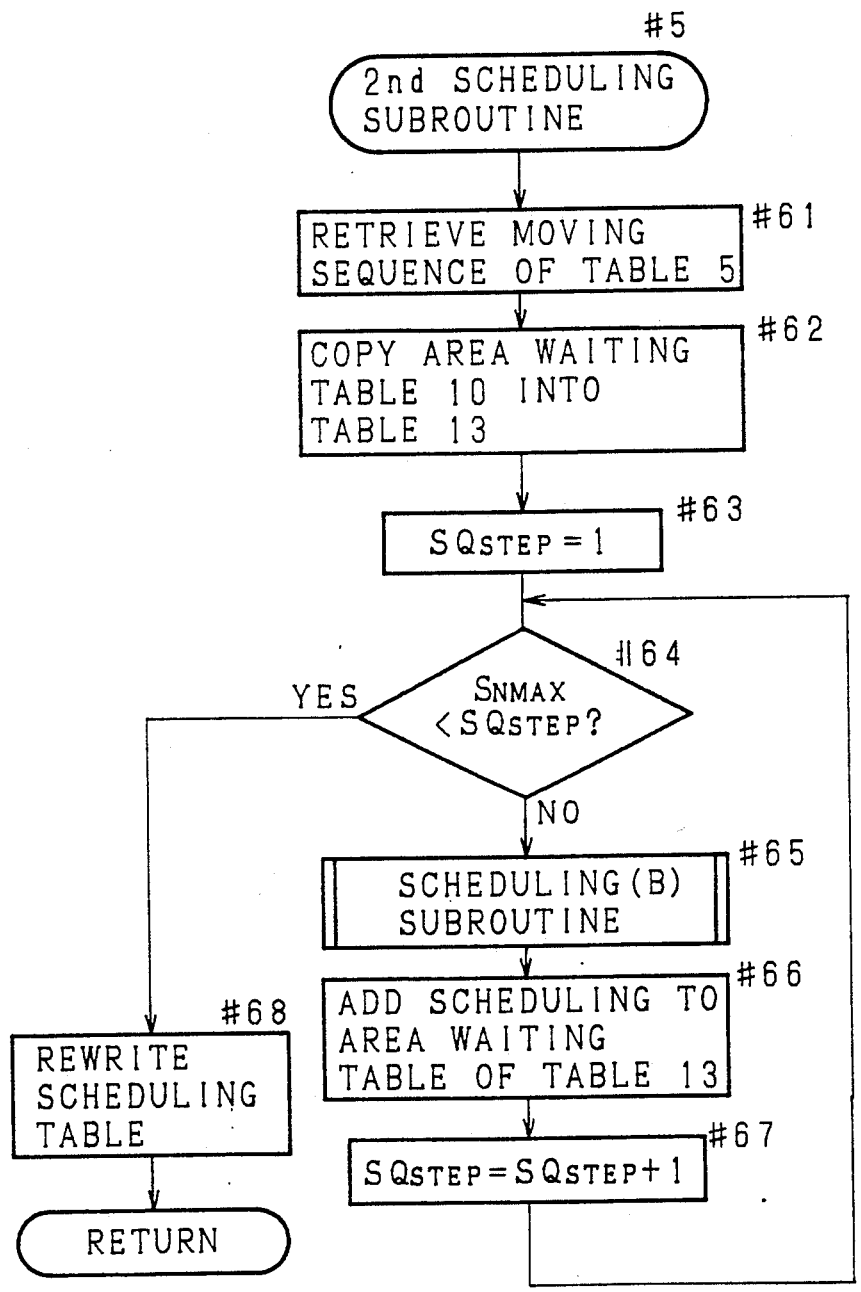
FIG. 8 is a flow chart of a second scheduling subroutine.

FIG. 8 is a flow chart of a second scheduling subroutine using a predetermined moving sequence. First in Step #61, on the basis of the wagon last station $W_{LAST}$ of the wagon condition shown in Table 9, the moving sequence of Table 5 is retrieved, and the maximum value $S_{NMAX}$ of the sequence step is set. Then in Step #62, the area waiting table of Table 10 is copied into Table 13, and in Step #63, the sequence step $SQ_{STEP}$ is set to 1 and in Step #64, whether the sequence step $SQ_{STEP}$ is larger than the maximum value $S_{NMAX}$ is determined. If so, since all sequence steps are completed, schedules of Tables 7~10 are rewritten in Step #68 and the procedure is returned. If not, scheduling (B) is executed in Step #65. In Step #66, the scheduling area waiting table of Table 13 is added and the sequence step is incremented by 1 in Step #67, then the procedure is returned to Step #64 to execute processings for the following sequence step.

Figure 9:
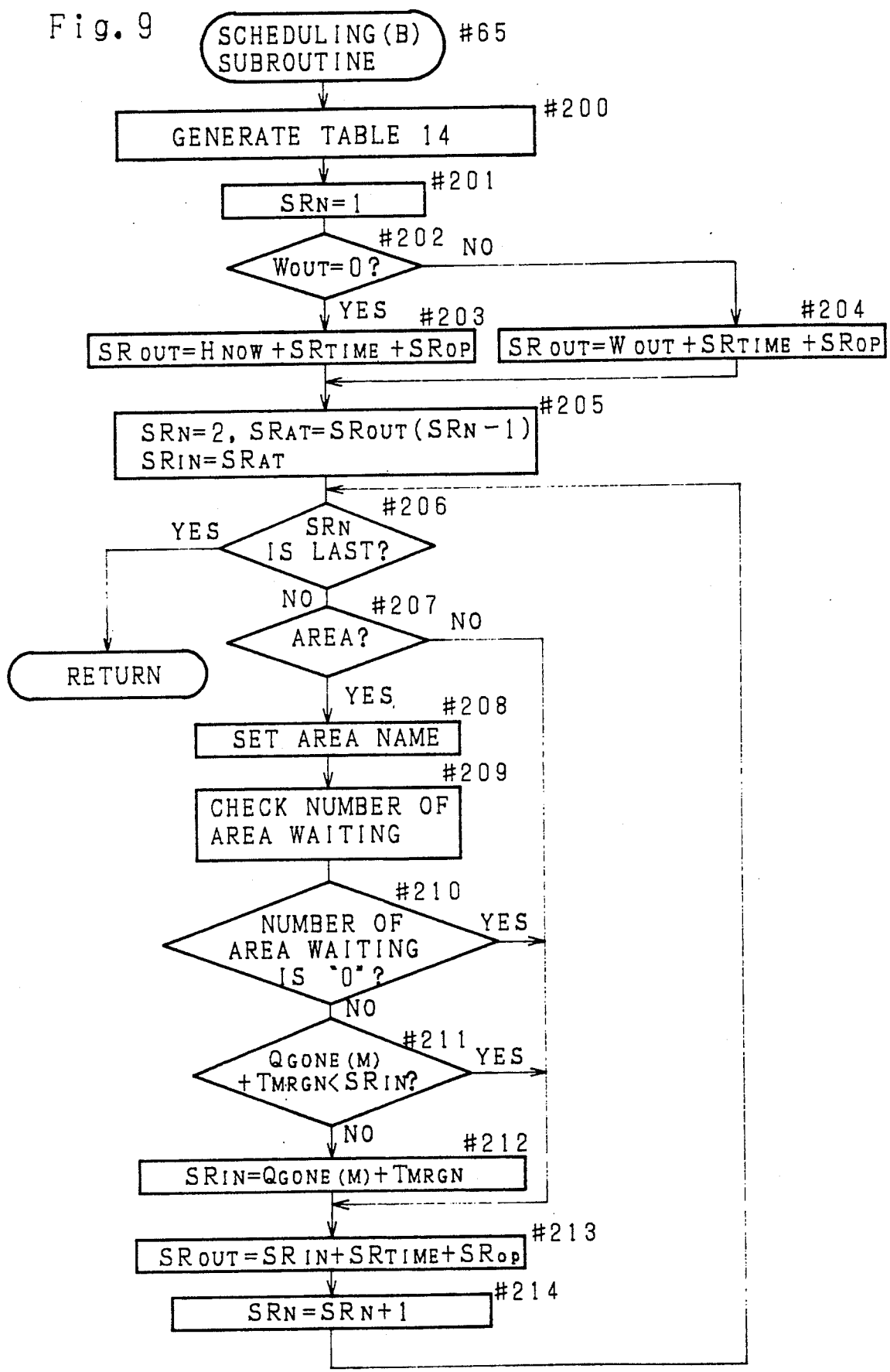
FIG. 9 is a flow chart of a scheduling (B) subroutine.

FIG. 9 is a flow chart of a scheduling (B) subroutine. In Step #200, the scheduling running schedule shown in Table 14 is generated using Tables 1~4. Then in Step #201, sequential numbering $SR_N=1$ is set, and in Step #202, it is determined whether the arrival schedule time $W_{OUT}$ is 0. If $W_{OUT}=0$, since running is possible from the present time $H_{NOW}$, in Step #203, the escape time $SR_{OUT}$ from the area becomes $H_{NOW}+SR_{TIME}+SR_{OP}$. If $W_{OUT}\neq 0$, in Step #204, $SR_{OUT}=W_{OUT}+SR_{TIME}+SR_{OP}$. In Step #205, sequential numbering $SR_{N_{TIME}}+SR_{OP}$ is set to 2, and $SR_{AT}$ at this time is set to the preceding transit location, or in this case to the escape time $SR_{OUT}$ of $SR_{IN}$, which is set to $SR_{AT}$. Then in Step #206, whether the sequential numbering $SR_N$ is the last is determined, and if so, the procedure is returned, and if not, whether it is the area or not is determined in Step #207 by whether the sequential numbering $SR_N$ is the even or the odd number.

If the sequential numbering $SR_N$ is the odd number, since it is the area, the area name is set in Step #208, and the number of area waiting M is checked according to Table 13 in Step #209, and whether the number of area waiting M is 0 or not is determined in Step #210. If M=0, since there is no wagon passing the area and since the wagon to be scheduled is at the head, the time is not necessary to be checked and the procedure is skipped to Step #213. If M$\neq$0, in Step #211, it is determined whether the sum of the escape time $Q_{GONE}(M)$ from the location of the wagon of sequence M in the scheduling area waiting table of Table 13, or the last wagon entering the area and $T_{MRGN}$ is smaller than the start entering time $SR_{IN}$ of the wagon. If so, the procedure is skipped to Step #213 since the last entering wagon is not interfered, and if not, $SR_{IN}$ is set to the sum. Thereby, the wagon is located in the utmost end of each of the areas by the area waiting table (Table 13). Escape time $SR_{OUT}=SR_{IN}+SR_{TIME}+SR_{OP}$ is set in Step #213, the sequential numbering $SR_N$ is incremented by 1 in Step #214 and the procedure is returned to Step #206 for processing of the next sequential numbering $SR_N+1$.

When the previous condition is applied herein, though scheduling is effected by the simulation of the first scheduling since shunting does not occur on the wagon of moving demand $D_N=1$, the first scheduling is impossible because the shunting of the wagon is generated in the first scheduling of moving demand $D_N=2$, so that after performing the first scheduling for three times according to FIG. 2, the scheduling is realized by moving sequences of the second scheduling. Since the last station $W_{LAST}$ of the wagon condition at scheduling of moving demand $D_N=2$ is as same as that of moving demand $D_N=1$, and as shown in Table 9, the wagon $W_N=1$ is at station S1 and the wagon $W_N=2$ is at station S8, the moving sequence $SQ_N=343$ shown in Table 5 is retrieved, scheduling (B) is executed at every sequence step $SQ_{STEP}$ and when processings of all sequence steps (to $SQ_{STEP}=2$) are completed, the schedule of Tables 7~10 are rewritten on the basis of Table 13.

The wagons are selected and the running routes are decided by the aforesaid method, thereafter, the central control unit 1 transmits entering permission to each of the wagons by a radio or the like according to the wagon running schedules (Table 7) and area waiting table (Table 10) decided, while receiving present position data from respective wagons to process erasing of the area and path from the wagon running schedule table (Table 7) and area waiting table (Table 10), whereby the operation of the entire system is managed continuously.

As described above, though the moving demand is first being realized by the first scheduling by simulation, since, in the scheduling, it will take time for processing depending upon the system condition at that time due to retrieving and processing for realizing the moving demand in a shortest time, a constant allowable restriction and reference are provided to reject the processing result as impractical when it exceeds the reference. Then, it is reprocessed after processing the other moving demand, but if it is still impractical after repetitions, the second scheduling is performed on the basis of the moving sequence. Since it is processed by the moving sequence preset on the basis of the last stations and moving demands of all wagons, though the moving demand may not be realized in a shortest time as the first scheduling, the moving demand is surely realized by the preset moving sequence.

By managing running schedules by utilizing the two schedulings, as compared with the scheduling by only the moving sequence, a memory capacity of a processing device can be reduced, data setting is simplified and the processing time is shortened as compared with the scheduling by only the simulation. Thus, the relatively low capacity and low speed processing device may be used, resulting in a low cost. In addition, the optimum wagon and running route can be selected for the moving demand and a deadlock can also be prevented. It is also possible to realize one route two-way running so that processing for the layout can be unified and standardized, improving the reliability and maintainability, resulting in reducing restrictions on the layout design considered hitherto on the basis of the moving demand, and simplifying the design and reducing a design cost. Fluctuations in the transportation efficiency against variations of the sequence of the moving demand can also be minimized.

Furthermore, since two-way running is possible, the layout efficiency and transportation efficiency can be improved, reducing the number of wagons as well as a system cost.

Moreover, since centralized control is adopted for all wagons, the remote control by a radio or the like is possible and local branch and junction sensors, photoelectric switches, wirings etc. can be deleted, reducing a cost and facilitating changes in layout, besides the scheduling is performed on the basis of the scheduled time so that not only the unloaded wagon but also the loaded wagon are subjected to scheduling, thus the wagon operating efficiency is improved.

In the embodiment, though the scheduling is disapproved when even one shunting is needed in the first scheduling by simulation, the present invention is not limited thereto, should the places of shunting, routes thereto, etc. be considered within an allowable limit of the processing time, the percentage of success by the first scheduling may be increased and the efficiency is further improved.

Also, in the embodiment, though the running route between stations is single for the purpose of simplifying the description, the present invention is not limited thereto, and the running route may be plural, in such a case, it is to be understood that a plurality of running routes are set for one moving demand, and in the first scheduling, the running route having a shortest time is decided therefrom.

In the embodiment, though there are 1568 ways of moving sequences including those which can be apparently settled by the first scheduling, if the latter are excluded, 56 ways may be sufficient.

Meanwhile, though running of the wagons according to the embodiment is executed on the basis of the scheduled time, when errors are accumulated in the scheduled time by obstacles or troubles of the wagons, setting data errors etc., it will be appreciated that corrections are suitably made by algorithm at every constant times or separately.

As described above, in the present invention, running schedules of the wagons are managed usually by the first scheduling by simulation, and by the second scheduling by moving sequences when a predetermined condition is not satisfied, thereby the processing time is shortened and the memory capacity is reduced and at the same time, by realizing single route two-way running, a flexible management of the running schedules can be realized.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

TABLE 1

| AREA NAME ($AR_{NM}$) | BEFORE PATH ($AR_{BP}$) | NEXT PATH ($AR_{NP}$) | TRANSIT TIME ($AR_{TIME}$) (SEC.) |
|---|---|---|---|
| A | a | e | 0 |
|   | a | i | 6 |
|   | e | a | 0 |
|   | e | i | 6 |
|   | i | a | 6 |
|   | i | e | 6 |
| B | b | f | 0 |
|   | b | i | 6 |
|   | b | j | 6 |
|   | i | b | 6 |
|   | i | f | 6 |
|   | i | j | 0 |
| L | h | h | 4 |

TABLE 2

| PATH NAME ($PS_{NM}$) | TRANSIT TIME ($PS_{NME}$) (SEC.) |
|---|---|
| a | 4 |
| b | 4 |
| c | 4 |
| d | 4 |
| e | 4 |
| f | 4 |
| g | 4 |
| h | 4 |
| i | 6 |
| j | 6 |

TABLE 2-continued

| PATH NAME (PS$_{NM}$) | TRANSIT TIME (PS$_{NME}$) (SEC.) |
|---|---|
| k | 6 |

TABLE 4

| STATION NAME | LODING TIME (ST$_{OUT}$) | UNLODING TIME (ST$_{OFFT}$) |
|---|---|---|
| S1 | 10 | 12 |
| S2 | 10 | 11 |
| S3 | 10 | 12 |
| S4 | 10 | 12 |
| S5 | 10 | 12 |
| S6 | 10 | 12 |
| S7 | 10 | 12 |
| S8 | 10 | 12 |

TABLE 3

| ROUTE NAME (R$_{NM}$) | FROM STATION (RT$_{FS}$) | TO STATION (RT$_{TS}$) | STEP 0 | 1 | 2 | 3 | 4 | 5 | 6 | 7 | 8 | 9 | 10 |
|---|---|---|---|---|---|---|---|---|---|---|---|---|---|
| 1 | 1 | 2 | E | a | A | i | B | b | F | | | | |
| 2 | 1 | 3 | E | a | A | i | B | j | C | c | G | | |
| 3 | 1 | 4 | E | a | A | i | B | j | C | k | D | d | H |
| 4 | 1 | 5 | E | a | A | e | I | | | | | | |
| 5 | 1 | 6 | E | a | A | i | B | f | J | | | | |
| 6 | 1 | 7 | E | a | A | i | B | j | C | g | K | | |
| 7 | 1 | 8 | E | a | A | i | B | j | C | k | D | h | L |
| 8 | 2 | 1 | E | b | B | i | A | a | E | | | | |
| 9 | 2 | 3 | | | | | | | | | | | |
| 10 | 2 | 4 | | | | | | | | | | | |
| 11 | 2 | 5 | | | | | | | | | | | |
| 12 | 2 | 6 | | | | | | | | | | | |
| 13 | 2 | 7 | | | | | | | | | | | |
| 14 | 2 | 8 | | | | | | | | | | | |
| 15 | 3 | 1 | | | | | | | | | | | |
| 16 | 3 | 2 | | | | | | | | | | | |
| . | . | . | | | | | | | | | | | |
| 50 | 8 | 1 | L | h | D | k | C | j | B | i | A | a | E |
| 51 | 8 | 2 | L | h | D | k | C | b | F | | | | |
| 52 | 8 | 3 | L | h | D | k | C | c | G | | | | |
| 53 | 8 | 4 | L | h | D | d | H | | | | | | |
| 54 | 8 | 5 | L | h | D | k | C | j | B | i | A | e | I |
| 55 | 8 | 6 | L | h | D | k | C | j | B | f | J | | |
| 56 | 8 | 7 | L | h | D | k | C | g | K | | | | |

TABLE 5

| SEQUENTIAL NUMBER (SQ$_N$) | WAGON LAST STATION | | | | | | | | MOVING DEMAND FROM STATION (SQ$_{FROM}$) | TO STATION (SQ$_{TO}$) | SEQUENCE STEP (SQ$_{STEP}$) 1 | | 2 | 3 |
|---|---|---|---|---|---|---|---|---|---|---|---|---|---|---|
| | 1 | 2 | 3 | 4 | 5 | 6 | 7 | 8 | | | ROUTE (SQ$_{RT}$) | UNLOADING FLAG (SQ$_{FLG}$) | | |
| 1 | O | O | | | | | | | 1 | 2 | 12 | 0 | 1 | 1 |
| 2 | O | O | | | | | | | 1 | 3 | 2 | 1 | | |
| 3 | O | O | | | | | | | 1 | 4 | 3 | 1 | | |
| 4 | O | O | | | | | | | 1 | 5 | 4 | 1 | | |
| 5 | O | O | | | | | | | 1 | 6 | 5 | 1 | | |
| 6 | O | O | | | | | | | 1 | 7 | 6 | 1 | | |
| 7 | O | O | | | | | | | 1 | 8 | 7 | 1 | | |
| 8 | O | O | | | | | | | 2 | 1 | 4 | 0 | 8 | 1 |
| 9 | O | O | | | | | | | 2 | 3 | | | | |
| 10 | O | O | | | | | | | 2 | 4 | | | | |
| 11 | O | O | | | | | | | 2 | 5 | | | | |
| 57 | O | | O | | | | | | | | | | | |
| | O | | O | | | | | | | | | | | |
| 337 | O | | | | | | | | O | 1 | 2 | | | |
| 338 | O | | | | | | | | O | 1 | 3 | | | |
| 339 | O | | | | | | | | O | 1 | 4 | | | |
| 340 | O | | | | | | | | O | 1 | 5 | | | |
| 341 | O | | | | | | | | O | 1 | 6 | | | |

TABLE 5-continued

| SEQUENTIAL NUMBER ($SQ_N$) | WAGON LAST STATION | | | | | | | | MOVING DEMAND | | SEQUENCE STEP ($SQ_{STEP}$) | | | | |
|---|---|---|---|---|---|---|---|---|---|---|---|---|---|---|---|
| | | | | | | | | | FROM STATION ($SQ_{FROM}$) | TO STATION ($SQ_{TO}$) | 1 | | | 2 | 3 |
| | 1 | 2 | 3 | 4 | 5 | 6 | 7 | 8 | | | ROUTE ($SQ_{RT}$) | UNLOADING FLAG ($SQ_{FLG}$) | | | |
| 342 | O | | | | | O | | | 1 | 7 | | | | | |
| 343 | O | | | | | O | | | 1 | 8 | 53 | 0 | | 7 | 1 |
| 1568 | | | | | | | | | 8 | 7 | | | | | |

TABLE 6

| NUMBER ($D_N$) | from ($D_{FROM}$) | to ($D_{TO}$) | NUMBER OF SCHEDULE ($D_S$) |
|---|---|---|---|
| 1 | 2 | 1 | 0 |
| 2 | 1 | 8 | 0 |

TABLE 8

| ST NO ($ST_N$) | LAST STOP WAGON ($ST_{LAST}$) |
|---|---|
| 1 | 1 |
| 2 | 0 |
| 3 | 0 |
| 4 | 0 |
| 5 | 0 |
| 6 | 0 |
| 7 | 0 |
| 8 | 2 |

TABLE 9

| WAGON NO. ($W_N$) | PRESENT AREA ($W_{NOW}$) | LAST STATION ($W_{LAST}$) | OUT ($W_{OUT}$) |
|---|---|---|---|
| 1 | E | 1 | 0 |
| 2 | L | 8 | 0 |

TABLE 10

| | ORDER ($Q_N$) | | | |
|---|---|---|---|---|
| | 1 | | | 2 |
| AREA ($Q_{AR}$) | WAGON NO. ($O_N$) | PRIORITY FLAG ($Q_{PRI}$) | in ($Q_{IN}$) | gone ($Q_{GONE}$) |
| A | 0 | | | |
| B | 0 | | | |
| C | 0 | | | |
| D | 0 | | | |
| E | 1 | 1 | 0 | 9999 |
| F | 0 | | | |
| G | 0 | | | |
| H | 0 | | | |
| I | 0 | | | |
| J | 0 | | | |
| K | 0 | | | |
| L | 2 | 1 | 0 | 9999 |

TABLE 11

| NO. ($C_N$) | FROM ROUTE ($C_{FROM}$) | TO ROUTE ($C_{TO}$) |
|---|---|---|
| 1 | | |
| 2 | | |
| $C_{MAX}$ | | |

TABLE 7

| | | | STEP ($RN_{STEP}$) | | | | | |
|---|---|---|---|---|---|---|---|---|
| | | | 1 | | | | | |
| | | | ITEM | | | | | |
| WAGON NO. ($RN_N$) | AREA ($RN_P$) | at ($RN_{AT}$) | in ($RN_{IN}$) | out ($RN_{OUT}$) | gone ($RN_{GONE}$) | POINTER OF AREA WAITING TABLE ($RN_{PTR}$) | 2 | 3 |
| 1 | E | 0 | 0 | 0 | 9999 | 1 | | |
| 2 | L | 0 | 0 | 0 | 9999 | 1 | | |

TABLE 12

| $C_N$ | $C_{FROM}$ | $C_{TO}$ |
|---|---|---|
| 1 | 1 | 8 |

TABLE 13

ADDED PART

| | ORDER ($Q_N$) | | | | | | | | | | |
|---|---|---|---|---|---|---|---|---|---|---|---|
| | 1 | | | | | | | | | | 2 |
| AREA ($Q_{AR}$) | $Q_W$ | $Q_{PRI}$ | $Q_{IN}$ | $Q_{GONE}$ | FRONT AREA ($Q_{BGN}$) | END AREA NAME ($Q_{EAR}$) | ORDER IN END AREA ($Q_{EN}$) | END AREA ($Q_{END}$) | FRONT AREA NAME ($Q_{BAR}$) | ORDER IN FRONT AREA ($Q_{BN}$) | PRE-ENTERING FLAG ($Q_{FLG}$) |
| A | | | | | | | | | | | |
| B | | | | | | | | | | | |
| C | | | | | | | | | | | |
| D | | | | | | | | | | | |
| E | | | | | | | | | | | |
| F | | | | | | | | | | | |

TABLE 13-continued

ADDED PART

ORDER ($Q_N$)

| AREA ($Q_{AR}$) | $Q_W$ | $Q_{PRI}$ | $Q_{IN}$ | $Q_{GONE}$ | FRONT AREA ($Q_{BGN}$) | END AREA NAME ($Q_{EAR}$) | ORDER IN END AREA ($Q_{EN}$) | END AREA ($Q_{END}$) | FRONT AREA NAME ($Q_{BAR}$) | ORDER IN FRONT AREA ($Q_{BN}$) | PRE-ENTERING FLAG ($Q_{FLG}$) | 2 |
|---|---|---|---|---|---|---|---|---|---|---|---|---|
| G | | | | | | | | | | | | |
| H | | | | | | | | | | | | |
| I | | | | | | | | | | | | |
| J | | | | | | | | | | | | |
| K | | | | | | | | | | | | |
| L | | | | | | | | | | | | |

$Q_{BGN}$: { 0: NOP, 1: FRONT AREA }

$Q_{END}$: { 0: NOP, 1: END AREA }

$Q_{FLG}$: { 0: NOP, 1: PRE-ENTER, 2: SUCCESSION }

TABLE 14

| SEQUENTIAL NUMBERING ($SR_N$) | LOCATION ($SR_P$) | WORKING TIME ($SR_{OP}$) | TRANSIT TIME ($SR_{TIME}$) | at ($SR_{AT}$) | in ($SR_{IN}$) | out ($SR_{OUT}$) |
|---|---|---|---|---|---|---|
| 1 | E | 0 | 2 | | | |
| 2 | a | 0 | 4 | | | |
| 3 | A | 0 | 6 | | | |
| 4 | i | 0 | 6 | | | |
| 5 | B | 0 | 6 | | | |
| 6 | b | 0 | 4 | | | |
| 7 | F | 10 | 4 | | | |
| 8 | b | 0 | 4 | | | |
| 9 | B | 0 | 6 | | | |
| 10 | i | 0 | 6 | | | |
| 11 | A | 0 | 6 | | | |
| 12 | a | 0 | 4 | | | |
| 13 | E | 12 | 2 | | | |

TABLE 15

| | $Q_{BGN}$ | $Q_{EAR}$ | $Q_{EN}$ | $Q_{END}$ | $Q_{BAR}$ | $Q_{BN}$ | $Q_{FLG}$ |
|---|---|---|---|---|---|---|---|
| A | 0 | 0 | 0 | 1 | B | ORDER OF OTHER WAGON IN AREA B | 2 |
| B | 1 | A | ORDER OF OTHER WAGON IN AREA A | 1 | C | ORDER OF OTHER WAGON IN AREA C | 2 |
| C | 1 | B | ORDER OF OTHER WAGON IN AREA B | 0 | 0 | 0 | 0 |
| D | 0 | 0 | 0 | 0 | 0 | 0 | 0 |

What is claimed is:

1. A managing method of a run of movable objects, comprising the steps of:

moving movable objects between communicating stations that are at locations along a plurality of running routes in response to movement demands which require that the movable objects be moved to the communicating stations; and avoiding deadlocks from arising as between the movable objects along the routes during the step of moving, the step of avoiding including:

a first step of simulation for attempting to satisfy each of the movement demands by simulating possible sequences of movement of the movable objects along the running routes based on consideration of an amount of time required for the movable objects to stay at the communicating stations and time required to move between the communicating stations, judging whether a condition has been fulfilled by comparing a number of times of shunting with a predetermined number, the shunting being a diversion of at least one of the movable objects to another location from a location on the running route of another of the movable objects as simulated in response to one of the movement demands, selecting said movable objects and said running routes along which said selected movable objects are to run in an effort to satisfy each of said movement demands, and allocating movements to the selected movable objects along the selected running routes only if the condition is judged as being fulfilled, and a second step of retrieval of a moving sequence of the movable objects for fulfilling each of said movement demands when said condition is judged as being not fulfilled by the first step, the second step being based on each of said movement demands and on an arrangement of the movable objects after completion of the allocated movements of said movable objects, the second step including choosing the movable objects and the running routes along which the chosen movable objects are to run to fulfill said movement demands, the second step also including allocating movements to the chosen movable objects along the chosen running routes in accordance with the retrieval of the moving sequence.

2. A managing method as in claim 1, wherein at said first step, when a number of shunting is more than the predetermined number, said condition is judged as not being fulfilled, and the simulation for one of said movement demands is abandoned and that for another movement demand is performed.

3. A managing method as in claim 2, wherein said condition is decided based on a number of abandoned simulations.

4. A managing method as in claim 1, wherein at said first step, when the running time of the movable object simulated is longer than a predetermined time, said condition is judged as not being fulfilled, and the simulation for said moving demand is abandoned and that for the other moving demand is performed.

5. A managing method as in claim 4, wherein said condition is decided based on a number of abandoned simulations.

6. A managing method as in claim 1, wherein the judging of whether said condition has been fulfilled with respect to each of the possible sequences of movement being simulated is based on number of times of shunting of the movable objects along the running routes that takes place during the simulating of possible sequences of movement.

7. A managing method as in claim 1, wherein the step of moving includes moving the movable objects between communicating stations in two opposite directions along the same route between the communicating stations.

* * * * *